Oct. 14, 1952     H. M. MELZER     2,613,757
PORTABLE LOUD-SPEAKER HEATER ATTACHMENT FOR DRIVE-IN THEATERS
Filed Feb. 7, 1949     2 SHEETS—SHEET 1
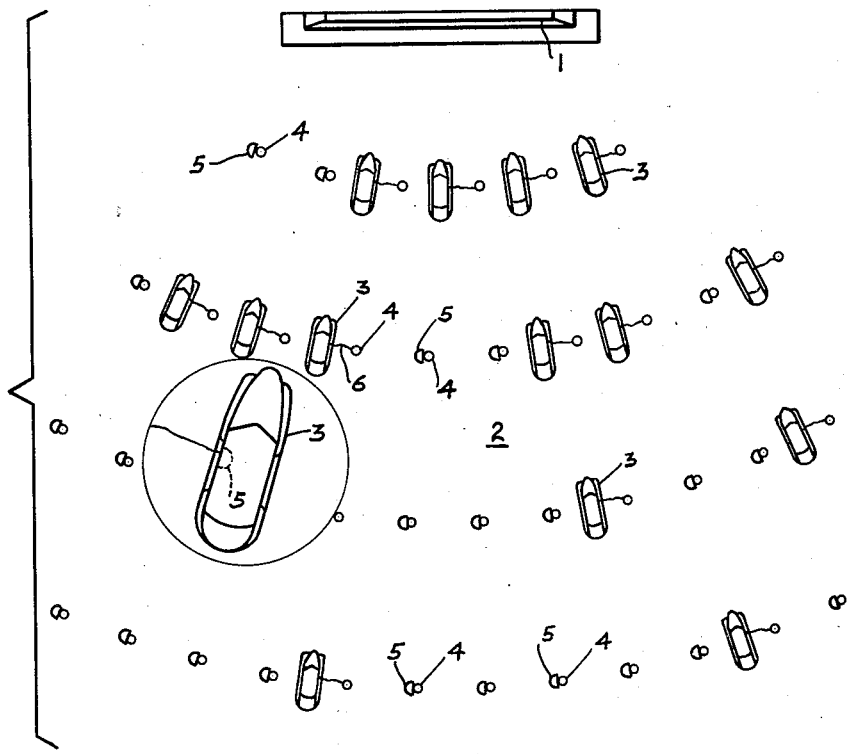
Fig.1.
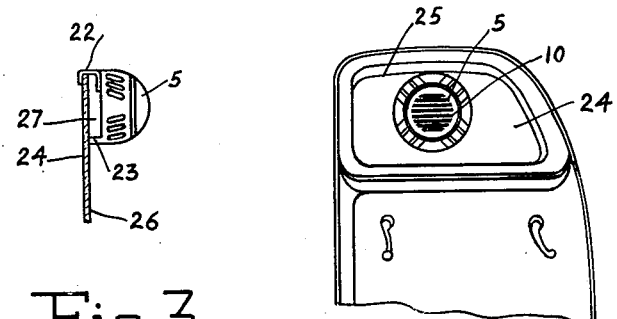
Fig.3.
Fig.2.
INVENTOR.
HERMAN M. MELZER.
BY
Christy, Parmelee, & Strickland
ATTORNEYS.

Oct. 14, 1952 — H. M. MELZER — 2,613,757
PORTABLE LOUD-SPEAKER HEATER ATTACHMENT FOR DRIVE-IN THEATERS
Filed Feb. 7, 1949 — 2 SHEETS—SHEET 2

INVENTOR.
HERMAN M. MELZER.
BY Christy, Parmelee & Strickland
ATTORNEYS.

Patented Oct. 14, 1952

2,613,757

UNITED STATES PATENT OFFICE 2,613,757

PORTABLE LOUD-SPEAKER HEATER ATTACHMENT FOR DRIVE-IN THEATERS

Herman M. Melzer, McKeesport, Pa.

Application February 7, 1949, Serial No. 74,931

8 Claims. (Cl. 181—31)

1

This invention relates to a speaker-heater attachment for use in automobiles, and, more particularly, to a speaker-heater attachment for use in connection with automobiles parked in an outdoor theater of the drive-in type.

Within recent years, outdoor theaters of the drive-in type, in which provision is made for parking automobiles in such manner that the occupants can watch a motion picture, have become increasingly common. In such theaters, parking posts having speaking units connected thereto are provided, and the automobiles are driven to positions conveniently adjacent one of such posts. The speaker unit connected to the adjacent post is then placed within the passenger compartment of the automobile. The speaker unit thus positioned within the automobile supplies the sound accompanying the motion picture being projected on a screen at a distance from the automobile, and being viewed by the occupants therein.

Outdoor theaters of the drive-in type have heretofore been seasonal affairs, being open during the warmer seasons and being closed during the colder or winter season. In cold weather, people are reluctant to patronize drive-in theaters due to the discomfort occasioned by the low temperatures. It has been found that the average person will not use the conventional heater in his automobile while parked, since all of such heaters require that the motor be maintained in operation in order that they will produce heat. Consequently, it has been necessary to close outdoor theaters with the advent of cold weather.

One of the principal objects of this invention is to provide a speaker-heater attachment for automobiles which will maintain the passenger compartment warm in cold weather, and which will thus eliminate the necessity of closing theaters of this type with the advent of winter weather.

A further object of this invention is to provide a portable electric heater for temporary attachment within the passenger compartment of a motor vehicle.

A still further object of the invention is to provide a portable electric heater for temporary attachment within the passenger compartment of a motor vehicle, and in which there is provided a casing or housing for a fan which is operable to circulate air in and out of spaced openings in the casing, and over electrical heating elements positioned within the housing, and in the path of movement of the air therethrough.

Other objects and advantages of the invention will become apparent from the following description.

In the drawings there is shown a preferred embodiment of the invention. In this showing:

Fig. 1 is a diagrammatic sketch illustrating an outdoor theater of the drive-in type, and showing within the circle an enlarged view of an automobile parked within the theater;

Fig. 2 is a fragmentary elevational view of an automobile door from the interior thereof illustrating a speaker-heater attachment constructed in accordance with the principles of this invention mounted thereon;

Fig. 3 is a fragmentary sectional view with the speaker-heater attachment shown in side elevation and illustrating the manner in which it is supported on the door window;

Figure 4:
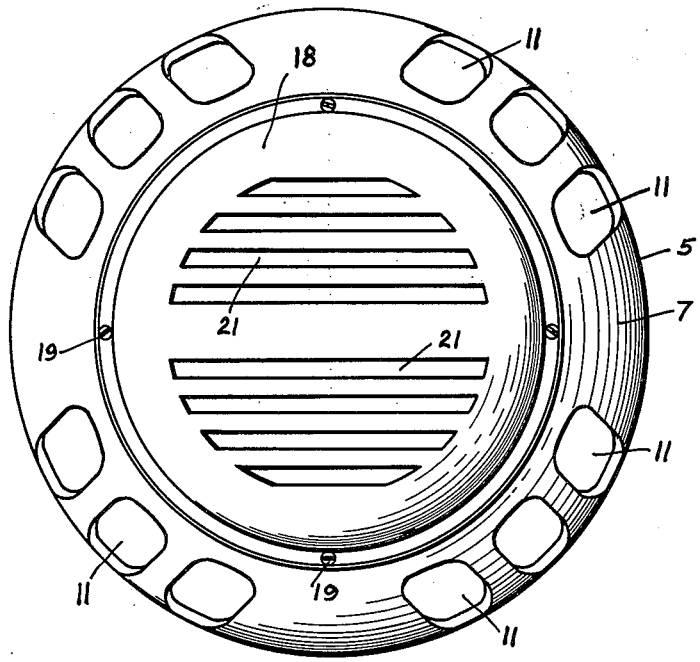
Fig. 4 is an enlarged front elevation view of the speaker-heater attachment shown in Fig. 2.

Referring to Fig. 1 of the drawings, the numeral 1 designates a motion picture screen of the type customarily provided at drive-in theaters, and on which a motion picture may be projected by a suitable motion picture projection machine (not shown). The numeral 2 designates a parking space on which automobiles 3 may be driven to parking positions from which the picture on the screen 1 may be viewed. The parking spaces for automobiles 3 are defined by a plurality of posts 4 having a speaker-heater attachment 5 detachably supported thereon. When an automobile 3 is driven to a post adjacent one of the posts 4, the speaker-heater attachment 5 is removed from the adjacent post 4 and mounted in position within the interior of an automobile 3, as indicated by the dotted lines within the circle in Fig. 1. The speaker-heater attachments 5 are provided with flexible leads 6 through which heating and audio currents are supplied to the speaker-heater attachments 5 by common supply lines (not shown).

Figure 5:
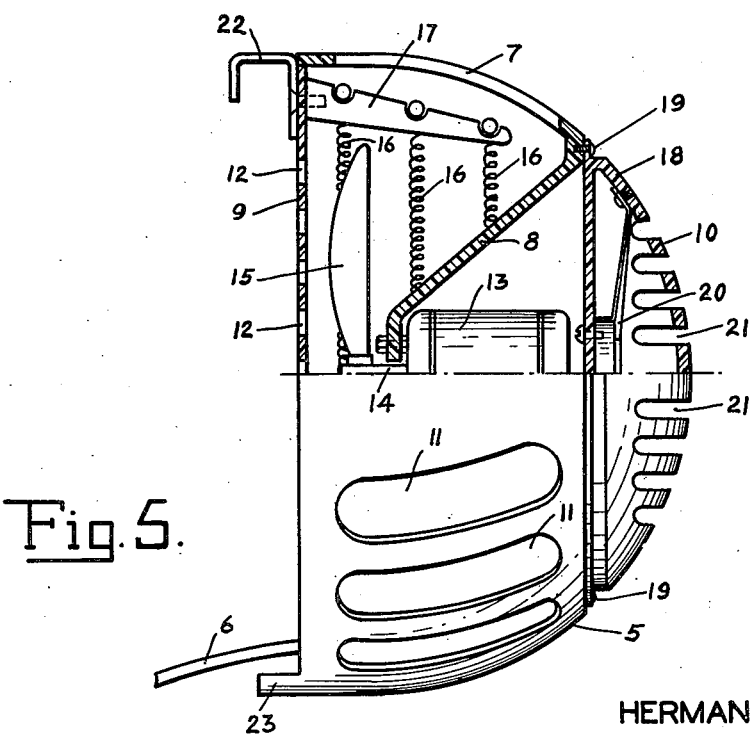
Fig. 5 is a side view of the unit shown in Fig. 4, a part thereof being shown in vertical section.

The structure of the speaker-heater attachments 5 will be best understood by referring to Figs. 4 and 5. From this showing, it will be noted that each of the units 5 preferably has the shape of a semi-sphere and comprises a housing which includes a body portion 7, a bracket portion 8, and end portions 9 and 10. The parts forming the housing of the unit 5 are preferably molded from a suitable material, such as a moldable plastic, but any other material may be employed in the construction of the housing. The body portion 7 is a shell having the shape of a truncated semi-sphere, but may be any other convenient shape, and is provided with a plurality of air exhaust openings 11 therein. The part 9 is a circular plate having a plurality of air inlet openings 12 therein, and is secured in a position closing the large end of the truncated shell 7 at the left thereof, as viewed in Fig. 4. The part 8 at the other end of the shell 7 has the shape of a truncated cone which extends inwardly from the small end of the shell 7 and is preferably integrally connected thereto. The part 8 provides a bracket support to which an electric motor 13 is secured, the motor 13 being positioned on the side of the part 8 opposite the back plate 9. The bracket structure 8 is provided with a central opening through which a motor shaft 14 extends and to which a fan 15 is connected, the fan being positioned in the space between the bracket structure 8 and the back plate 9. Rotation of the fan 15 by the motor 13 will be effective to draw air into the housing through the inlet openings 12, and discharge or force air from the housing outwardly through the openings 11. It will be noted that the shape of the supporting bracket 8 is effective to direct the air drawn into the housing toward the outlet openings 11. In the path of movement of the air through the housing, there is provided a plurality of electrical heating elements 16 which are mounted within the housing by ceramic insulators 17 secured to the back plate 9.

The part 10 is a loud speaker unit having a housing 18 which is secured to the shell 7 by screws 19. The housing 18 is in the shape of a spherical segment which is so constructed that its contour completes the semi-spherical shape of the unit 5. A speaker unit 20 is secured in position in the housing 18 and sound produced thereby may move outwardly through slots 21 formed in the housing 18. The structure of the speaker unit 20 forms no part per se of this invention and has not been illustrated in detail, any conventional speaker unit being employable for the purposes of this invention. The housing 18 forms a closure for the small end of the shell 7 at the right thereof as viewed in Fig. 5, and functions to conceal the motor 13 provided in the unit 5.

Heating current for the elements 16 and operating current for the motor 13 is supplied by the flexible lead 6 through suitable connections (not shown) within the housing of the unit 5. Similarly, audio modulated current for operating the speaker 20 is supplied thereto through the flexible lead 6. Suitable conventional controls (not shown) for disconnecting the heating elements 16 and the motor 13, independently of each other, from their sources of operating current, and for controlling the volume of the sound emitted by the speaker unit 21 are provided for the unit 5.

To mount the unit 5 in position within the passenger compartment of a motor vehicle, there is provided a hook shaped hanger or bracket element 22 which is secured to the back plate 9. At a point diametrically opposite the bracket element 22, there is provided a projecting part 23 for a purpose to be described. The unit 5 is preferably mounted on one of the windows of the passenger compartment, as shown in Figs. 2 and 3. To mount the unit, the window 24 is first lowered to permit insertion of the unit 5 into the passenger compartment. The hanger element 22 is then hooked over the upper edge 25 of the window 24, as shown in Fig. 3, with the projecting part 23 in engagement with the inner surface 26 of the window 24. The part 23, in abutting engagement with the surface 26, maintains a space 27 between the back plate 9, and the surface 26 of the window in order that air to be heated may move freely through the openings 12 in the back plate 9. Although it is preferred that the unit 5 be mounted on a window as described above, it will be understood that the bracket 22 is so constructed that the unit 5 may be readily mounted on the steering wheel, dash board, or any other suitable projecting part on the interior of the passenger compartment.

From the foregoing, it will be apparent that the unit 5 provides a compact arrangement of structure for supplying the sound accompanying the motion picture being viewed and for supplying the heat necessary to maintain the passenger compartment warm in cold weather. Attention is particularly invited to the fact that the arrangement of the plurality of openings 11 around the periphery of the shell 7 diffuses the heated air being delivered to the passenger compartment without any objectionable blast of hot air in any direction. In connection with this feature, it will be noted that the shape of the bracket structure 8 cooperates with the fan 15 in the delivery of a uniform amount of air to all of the openings 11, and that the heating elements 16 in the path of movement of the air toward the discharge openings 11 effect a uniform heating of such air. By reason of the provision of this structure, the passenger compartment of a motor vehicle may be maintained comfortably warm in cold weather without the necessity of operating the vehicle motor, and it is thus possible to operate a drive-in theater on a year around basis, thereby eliminating the shutdowns heretofore necessitated by cold weather.

While I have illustrated and described one specific embodiment of my invention, it will be understood that this is merely by way of illustration, and that various changes and modifications may be made therein within the contemplation of my invention and under the scope of the following claims.

I claim:

1. A portable speaker and heater attachment for insertion in passenger automobiles when parked in outdoor theaters comprising an housing having a body portion substantially in the shape of a truncated shell with air passage openings therethrough, a plate closing one end of said shell and also having air openings therethrough, a supporting bracket structure secured to said shell, a fan mounted on said supporting bracket structure for drawing air in through one of said openings and exhausting air out through the other of said openings, heating elements for heating the air being moved by said fan, a speaker mounted on said shell and covering the other end thereof, and supporting elements for mounting said attachment within the passenger compartment of an automobile with said plate spaced from the surfaces defining the interior of such compartment comprising a hook secured to said housing for supporting engagement over the upper edge of an automobile window, and a leg projecting outwardly from said plate and spaced from said hook for abutting engagement with a surface of the window at points spaced from its upper edge to maintain said plate spaced from the window so as to allow free movement of air through the openings therein.

2. A portable heater for temporary attachment in position within the interior of a motor vehicle comprising a housing having a body portion substantially in the shape of a truncated shell with air passage openings therethrough, a plate closing one end of said shell and also having air openings therethrough, a supporting bracket structure secured to said shell, a fan mounted on said supporting bracket structure for drawing air in through one of said openings and exhausting air out through the other of said openings, heating elements for heating the air being moved by said fan, and supporting elements for mounting the heater in position within the passenger compartment of a motor vehicle comprising a hook secured to said housing for supporting engagement over the upper edge of an automobile window, and a leg projecting outwardly from said plate and spaced from said hook for abutting engagement with a surface of the window at points spaced from its upper edge to maintain said plate spaced from the window so as to allow free movement of air through the openings therein.

3. A portable heater for temporary attachment in position within the interior of a motor vehicle comprising a housing having a body portion substantially in the shape of a truncated shell with air passage openings therethrough, a plate closing one end of said shell and also having air openings therethrough, a truncated bracket structure secured to said shell and extending inwardly from the other end thereof, a fan positioned between one side of said bracket structure and said plate for drawing air through one of said openings and discharging it through the other of said openings, an electric motor for operating said fan mounted on the other side of said bracket structure, heating elements mounted within said shell, said bracket structure being operable to direct the air forced by said fan through the shell openings over said heating elements, a speaker unit secured to the other end of said shell and concealing the motor mounted on said bracket structure, a hook secured to said housing for supporting engagement over the upper edge of an automobile window, and a leg projecting outwardly from said plate and spaced from said hook for abutting engagement with a surface of the window at points spaced from its upper edge to maintain said plate spaced from the window so as to allow free movement of air through the openings therein.

4. A portable heater comprising a housing having a base plate at one end thereof with side walls extending outwardly from and encompassing its peripheral edge, said plate being provided with air inlet openings and said side walls being provided with air outlet openings at uniformly spaced intervals, and a mounting bracket secured to said side walls in spaced relation to said plate and forming a closure for the other end of said housing, said bracket having a surface facing toward said inlet openings for deflecting air moving there against toward said outlet openings, an electric fan comprising a motor mounted on one side of said bracket, a drive shaft operated by said motor and extending through said bracket, and a fan mounted on said shaft in the space between said base plate and bracket for drawing air in through said inlet openings and moving it toward said bracket surface, heating elements in the space between said inlet and outlet openings for heating the air being moved by said fan, the uniform spacing of said outlet openings being operative to distribute the air evenly without any noticeable blast, and a cover connected to said side walls at the other end of said housing and cooperating with said bracket to form an enclosure for said motor.

5. A heater as claimed in claim 4 together with a hook connected to said plate for engagement over the top edge of a vertically extending supporting member, and a part projecting outwardly from said plate at a point spaced from said hook for engagement with said member to hold the plate spaced from the surface of said member so that air to be heated may enter freely through said inlet openings.

6. A portable speaker and heater attachment for insertion in passenger automobiles when parked in outdoor theaters comprising a housing having a body portion substantially in the shape of a truncated shell with an air inlet at one axial end thereof, a bracket secured to and closing the other axial end of said shell, said shell having lateral air outlet openings at spaced intervals about its periphery, said bracket having a conical contour with its apex positioned adjacent said one axial end whereby it is effective to deflect air entering said inlet openings laterally toward all of said outlet openings, electrical heating elements positioned in the path of movement of air through said casing, and a fan mounted on said bracket and positioned between its apex and said air inlet for drawing air through said inlet and discharge through said outlet openings.

7. A portable speaker and heater attachment for insertion in passenger automobiles when parked in outdoor theaters comprising a housing having a body portion substantially in the shape of a truncated shell with an air inlet at one axial end thereof, a bracket secured to and closing the other axial end of said shell, said shell having lateral air outlet openings at spaced intervals about its periphery, said bracket having a conical contour with its apex positioned adjacent said one axial end whereby it is effective to deflect air entering said inlet openings laterally toward all of said outlet openings, electrical heating elements positioned in the path of movement of air through said casing, a fan mounted on said bracket and positioned between its apex and said air inlet for drawing air through said inlet and discharge through said outlet openings, and a motor for operating said fan mounted on said bracket in the space between its apex and the other end of said shell.

8. A portable speaker and heater attachment for insertion in passenger automobiles when parked in outdoor theaters comprising a housing having a body portion substantially in the shape of a truncated shell with an air inlet at one axial end thereof, a bracket secured to and closing the other axial end of said shell, said shell having lateral air outlet openings at spaced intervals about its periphery, said bracket having a conical contour with its apex positioned adjacent said one axial end whereby it is effective to deflect air entering said inlet openings laterally toward all of said outlet openings, electrical heating elements positioned in the path of movement of air through said casing, a fan mounted on said bracket and positioned between its apex and said air inlet for drawing air through said inlet and discharge through said outlet openings, a motor for operating said fan mounted on said bracket in the space between its apex and the other end of said shell, and a speaker unit mounted on said other end of said shell and cooperating with said bracket to form a concealed enclosure for said motor.

HERMAN M. MELZER.

REFERENCES CITED

The following references are of record in the file of this patent:

UNITED STATES PATENTS

| Number | Name | Date |
| --- | --- | --- |
| 1,185,987 | Emerson | June 6, 1916 |
| 1,673,149 | Kohn et al. | June 12, 1928 |
| 1,952,514 | Selby | Mar. 27, 1934 |
| 2,027,605 | McCord | Jan. 14, 1936 |
| 2,067,102 | Simon | Jan. 5, 1937 |
| 2,218,212 | Nassos | Oct. 15, 1940 |